(12) United States Patent
Taguchi et al.

(10) Patent No.: US 8,177,994 B2
(45) Date of Patent: May 15, 2012

(54) ELECTROLYTIC SOLUTION FOR ALUMINUM ELECTROLYTIC CAPACITORS, AND ALUMINUM ELECTROLYTIC CAPACITOR USING THE SAME

(75) Inventors: Shinya Taguchi, Munakata (JP); Shinya Sasada, Kyoto (JP); Azusa Kameo, Yokohama (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 580 days.

(21) Appl. No.: 12/305,285

(22) PCT Filed: Jun. 6, 2007

(86) PCT No.: PCT/JP2007/000610
§ 371 (c)(1),
(2), (4) Date: Jun. 10, 2009

(87) PCT Pub. No.: WO2007/148430
PCT Pub. Date: Dec. 27, 2007

(65) Prior Publication Data
US 2009/0256105 A1    Oct. 15, 2009

(30) Foreign Application Priority Data

Jun. 20, 2006  (JP) ................................. 2006-169553
Oct. 27, 2006  (JP) ................................. 2006-291883

(51) Int. Cl.
*H01G 9/035*      (2006.01)
(52) U.S. Cl. ........ 252/62.2; 361/504; 361/509; 361/506
(58) Field of Classification Search ................. 252/62.2; 361/504, 509, 506
See application file for complete search history.

(56) References Cited

U.S. PATENT DOCUMENTS

| | | | | |
|---|---|---|---|---|
| 2,934,682 | A * | 4/1960 | Schwarz et al. | 361/505 |
| 4,189,761 | A * | 2/1980 | Finkelstein et al. | 361/505 |
| 5,629,829 | A | 5/1997 | Ikeya | |
| 5,870,275 | A * | 2/1999 | Shiono et al. | 361/504 |
| 7,072,173 | B2 | 7/2006 | Takeda et al. | |
| 2006/0007629 | A1 | 1/2006 | Takeda et al. | |

FOREIGN PATENT DOCUMENTS

| | | | |
|---|---|---|---|
| EP | 0944103 | A2 | 9/1999 |
| EP | 0996134 | A2 | 4/2000 |
| JP | 08-088146 | A | 4/1996 |
| JP | 2002-110463 | A | 4/2002 |
| JP | 2003-142346 | A | 5/2003 |
| JP | 2004-214637 | A | 7/2004 |
| JP | 2005-045225 | A | 2/2005 |
| JP | 2005-340406 | A | 12/2005 |
| WO | 95/15572 | A1 | 6/1995 |

OTHER PUBLICATIONS

Chinese Office Action dated Feb. 1, 2011, issued in corresponding Chinese Patent Application No. 200780023290.X.
Notice of Reasons for Refusal dated Nov. 30, 2010, issued in corresponding Japanese Patent Application No. 2007-152413.
International Search Report of PCT/JP2007/000610, date of mailing Jul. 24, 2007.
Notification of Transmittal of Translation of the International Preliminary Report on Patentability (Form PCT/IB/338) of International Application No. PCT/JP2007/000610 mailed Jan. 8, 2009 with Forms PCT/IB/373 and PCT/ISA/237.
European Search Report dated Aug. 2, 2011, issued in corresponding European Patent Application No. 07737265.4.

* cited by examiner

*Primary Examiner* — Carol M Koslow
(74) *Attorney, Agent, or Firm* — Westerman, Hattori, Daniels & Adrian, LLP

(57) ABSTRACT

The present invention provides an electrolytic solution for aluminum electrolytic capacitors which has a high sparking voltage while maintaining its specific conductivity at 30° C. of 4 to 25 mS/cm and which has no possibility of corroding capacitor elements, and an aluminum electrolytic capacitor using the same. The electrolytic solution of the present invention is characterized as being an electrolytic solution containing an electrolyte (C) composed of an alkyl phosphate anion (A) represented by formula (1) or (2) given below and a cation (B), and an organic solvent (D), wherein the content of phosphoric acid in the electrolytic solution is 1% by weight or less:

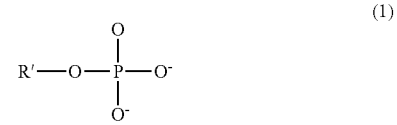

(1)

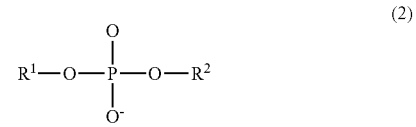

(2)

wherein $R^1$ is an alkyl group having 1 to 10 carbon atoms and $R^2$ is a hydrogen atom or an alkyl group having 1 to 10 carbon atoms.

7 Claims, No Drawings

ELECTROLYTIC SOLUTION FOR ALUMINUM ELECTROLYTIC CAPACITORS, AND ALUMINUM ELECTROLYTIC CAPACITOR USING THE SAME

TECHNICAL FIELD

The present invention relates to an electrolytic solution for electrolytic capacitors and to an electrolytic capacitor using the same.

BACKGROUND ART

Recently, electrolytic solutions which maintain their specific conductivity at 4 mS/cm or more and simultaneously have a high sparking voltage have increasingly been desired with increase in working voltage of power supplies for vehicle-mounted electrical components and digital home appliances.

As such an electrolytic solution for aluminum electrolytic capacitors, an electrolytic solution containing an organic solvent and an electrolyte composed of phthalic acid and a quaternary salt of a compound having an N,N,N'-substituted amidine group (e.g., 1-methylimidazole and 1,2-dimethylnmidazoline) is known (see patent document 1).

On the other hand, an electrolytic solution containing an organic solvent and an electrolyte composed of a tetrafluoroaluminate ion is known (see patent document 2).

[Patent document 1] WO 95/15572
[Patent document 2] JP2003-142346A

DISCLOSURE OF THE INVENTION

Problem to be Solved by the Invention

The former electrolytic solution has a problem of an excessively low sparking voltage.

The latter one is high in a sparking voltage, but there is a problem with it that tetrafluoroaluminic acid is hydrolyzed to generate hydrogen fluoride, which corrodes aluminum oxide serving as an anode foil of an electrolytic capacitor.

A problem to be solved by the present invention is to provide an electrolytic solution for aluminum electrolytic capacitors which has a high sparking voltage while maintaining its specific conductivity at 30° C. of 4 to 25 mS/cm and which has no possibility of corroding capacitor elements, and to provide an aluminum electrolytic capacitor using the same.

Means for Solving the Problem

The present inventors made earnest investigations in order to solve the above-mentioned problem and, as a result, reached the present invention. That is, the present invention is directed to an electrolytic solution containing an electrolyte (C) composed of an alkyl phosphate anion (A) represented by formula (1) or (2) given below and a cation (B), and an organic solvent (D), wherein the content of phosphoric acid contained in the electrolytic solution is 1% by weight or less, and an aluminum electrolytic capacitor using the electrolytic solution:

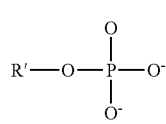

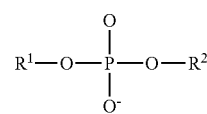

wherein $R^1$ is an alkyl group having 1 to 10 carbon atoms and $R^2$ is a hydrogen atom or an alkyl group having 1 to 10 carbon atoms.

Effect of the Invention

The electrolytic solution of the present invention has a high sparking voltage while maintaining its specific conductivity at 30° C. of 4 to 25 mS/cm and has no possibility of corroding capacitor elements.

BEST MODE FOR CARRYING OUT THE INVENTION

<Alkyl phosphate anion (A)>

From the viewpoint of a specific conductivity and a sparking voltage, the number of the carbon atoms of the alkyl groups ($R^1$, $R^2$) is 1 to 10, is preferably 1 to 8, more preferably 1 to 6, and particularly preferably 1 to 4. The smaller the number of carbon atoms is, the higher the specific conductivity and the sparking voltage are.

Since phosphoric acid corrodes capacitor elements (especially, aluminum oxide foil, which is an anode of an aluminum electrolytic capacitor), the alkyl phosphate anion is required to have at least one alkyl group. An alkyl phosphate anion (A) is hydrolyzed with use of a capacitor (including a load test at 125° C.), so that phosphoric acid tends to increase. Therefore, the alkyl phosphate anion (A) is preferably an anion represented by formula (2), and more preferably an anion in which both $R^1$ and $R^2$ are alkyl groups.

The amount of phosphoric acid, which will cause corrosion of capacitor elements (especially, aluminum oxide foil) is 1% by weight (henceforth, % by weight is written also as wt %) or less, preferably 0.5 wt % or less, and more preferably 0.1 wt % or less, relative to the weight of the electrolytic solution. In such ranges, capacitors are more resistant to electric defects (including a short circuit due to corrosion of electrode foil, etc.) even if the capacitors are subjected to a long-term use (including long-term reliability test).

The alkyl phosphate anion (A) includes (1) monoanions and dianions of monoalkyl phosphates and (2) monoanions of dialkyl phosphates.

(1) Monoalkyl phosphates {corresponding to alkyl phosphate anions (dianions) represented by formula (1) and alkyl phosphates ($R^2$ is an hydrogen atom; monoanions) represented by formula (2)}

Monomethyl phosphate, monoethyl phosphate, monopropyl phosphates [mono(n-propyl) phosphate and mono(isopropyl) phosphate], monobutyl phosphates [mono(n-butyl) phosphate, mono(isobutyl) phosphate, and mono(tert-butyl) phosphate], monopentyl phosphate, monohexyl phosphate, monoheptyl phosphate, monooctyl phosphates [mono(2-ethylhexyl) phosphate, etc.], and so on.

(2) Dialkyl phosphates {corresponding to alkyl phosphate anions (monoanions) represented by formula (2)}

Dimethyl phosphate, diethyl phosphate, dipropyl phosphates [di(n-propyl) phosphate and di(isopropyl) phosphate], dibutyl phosphates [di(n-butyl) phosphate, di(isobutyl) phosphate, and di(tert-butyl) phosphate], dipentyl phosphate, dihexyl phosphate, diheptyl phosphate, dioctyl phosphates [bis(2-ethylhexyl) phosphate, etc.], and so on.

As the alkyl phosphate anion (A), either a single kind of anion may be used or two or more kinds of anion may be used in combination. Alternatively, a mixture of a monoanion and a dianion may also be used.

Among these, monoanions represented by formula (2) wherein $R^1$ and $R^2$ are alkyl groups having 1 to 8 carbon atoms are preferable; dimethyl phosphate anion, diethyl phosphate anion, di(n-propyl) phosphate anion, di(isopropyl) phosphate anion, di(n-butyl) phosphate anion, di(isobutyl) phosphate anion, di(tert-butyl) phosphate anion, and bis(2-ethylhexyl) phosphate anion are more preferable.

While alkyl phosphates which are industrially available are generally mixtures of a monoalkyl phosphate, a dialkyl phosphate and a trialkyl phosphate, it is preferable in the present invention to use a dialkyl phosphate as the alkyl phosphate anion (A). While the method for obtaining a dialkyl phosphate anion is not particularly restricted, preferred is a method which includes mixing an imidazolium salt (monomethyl carbonate, hydroxide, etc.) and an industrially available trialkyl phosphate to perform hydrolysis, thereby obtaining a salt of an imidazolium cation with a dialkyl phosphate anion.

<Cation (B)>

Amidinium cations (B1), phosphonium cations, quaternary ammonium cations, etc. may be used as the cation (B).

The amidinium cations (B1) include (1) imidazolinium cations and (2) imidazolium cations.

(1) Imidazolinium Cations 1,2,3,4-Tetramethylimimdazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,2,3-trimethylimidazolinium, 1,3-dimethyl-2-ethylimidazolinium, 1-ethyl-2,3-dimethylimidazolinium, 1,2,3-triethylimidazolinium, 4-cyano-1,2,3-trimethylimidazolinium, 3-cyanomethyl-1,2-dimethylimidazolinium, 2-cyanomethyl-1,3-dimethylimidazolinium, 4-acetyl-1,2,3-trimethylimidazolinium, 3-acetylmethyl-1,2-dimethylimidazolinium, 4-methylcarbooxymethyl-1,2,3-trimethylimidazolinium, 3-methylcarboxymethyl-1,2-dimethylimidazolinium, 4-methoxy-1,2,3-trimethylimidazolinium, 3-methoxymethyl-1,2-dimethylimidazolinium, 4-formyl-1,2,3-trimethylimidazolinium, 3-formylmethyl-1,2-dimethylimidazolinium, 3-hydroxyethyl-1,2-dimethylimidazolinium, 4-hydroxymethyl-1,2,3-trimethylimidazolinium, 2-hydroxyethyl-1,3-drimethylimidazolinium, etc.

(2) Imidazolium Cations 1,3-Dimethylimidazolium, 1,3-diethylimidazolium, 1-ethyl-3-methylimidazolium, 1,2,3-trimethylimidazolium, 1,2,3,4-tetramethylimidazolium, 1,3-dimethyl-2-ethylimidazolium, 1-ethyl-2,3-dimethylimidazolium, 1,2,3-triethylimidazolium, 1,2,3,4-tetraethylimidazolium, 1,3-dimethyl-2-phenylimidazolium, 1,3-dimethyl-2-benzylimidazolium, 1-benzyl-2,3-dimethylimidazolium, 4-cyano-1,2,3-trimethylimidazolium, 3-cyanomethyl-1,2-dimethylimidazolium, 2-cyanomethyl-1,3-dimethylimidazolium, 4-acetyl-1,2,3-trimethylimidazolium, 3-acetylmethyl-1,2-dimethylimidazolium, 4-methylcarboxymethyl-1,2,3-trimethylimidazolium, 3-methylcarboxymethyl-1,2-dimethylimidazolium, 4-methoxy-1,2,3-trimethylimidazolium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium, 2-hydroxyethyl-1,3-dimethylimidazolium, etc.

Phosphonium cations include tetraalkyl phosphonium cations having alkyl groups having 1 to 4 carbon atoms {tetramethylphosphonium, tetraethylphosphonium, triethylmethylphosphonium, etc.}.

Quaternary ammonium cations include tetraalkylammonium cations having alkyl groups having 1 to 4 carbon atoms {tetramethylammonium, tetraethylammonium, triethylmethylammonium, etc.}, and so on.

Either one amidinium cation or a combination of two or more amidinium cations may be used. Among these, amidinium cations (B1) are preferable; 1,2,3,4-tetramethylimidazolinium cation, 1-ethyl-2,3-dimethylimidazolinium cation, 1-ethyl-3-methylimidazolium cation, and 1-ethyl-2,3-dimethylimidazolium cation are more preferable.

<Electrolyte (C)>

Examples of a combination of the alkyl phosphate anion (A) and the cation (B) include a combination of the monoanion and the monocation, a combination of the dianion and the monocation, and a combination of the monocation and a mixture of the monoanion and the dianion.

Examples of the electrolyte (C) include 1,2,3,4-tetramethyl imidazolinium monomethyl phosphate anion, 1,2,3,4-tetramethylimidazolinium dimethyl phosphate anion, 1,2,3,4-tetramethylimidazolinium monoethyl phosphate anion, 1,2,3,4-tetramethylimidazolinium diethyl phosphate anion, 1,2,3,4-tetramethylimidazolinium mono(n-propyl) phosphate anion, 1,2,3,4-tetramethyl imidazolinium di(n-propyl) phosphate anion, 1,2,3,4-tetramethylimidazolinium mono(isopropyl) phosphate anion, 1,2,3,4-tetramethylimidazolinium di(isopropyl) phosphate anion, 1,2,3,4-tetramethylimidazolinium mono(n-butyl) phosphate anion, 1,2,3,4-tetramethylimidazolinium di(n-butyl) phosphate anion, 1,2,3,4-tetramethylimidazolinium mono(isobutyl) phosphate anion, 1,2,3,4-tetramethylimidazolinium di(isobutyl) phosphate anion, 1,2,3,4-tetramethylimidazolinium mono(tert-butyl) phosphate anion, 1,2,3,4-tetramethylimidazolinium di(tert-butyl) phosphate anion, 1,2,3,4-tetramethylimidazolinium mono(2-ethylhexyl) phosphate anion, 1,2,3,4-tetramethylimidazolinium bis(2-ethylhexyl) phosphate anion, 1-ethyl-2,3-dimethylimidazolinium monoethyl phosphate anion, 1-ethyl-2,3-dimethylimidazolinium diethyl phosphate anion, 1-ethyl-3-methylimidazolium monoethyl phosphate anion, 1-ethyl-3-methylimidazolium diethyl phosphate anion, 1-ethyl-2,3-dimethylimidazolium monoethyl phosphate anion, 1-ethyl-2,3-dimethylimidazolium diethylphosphate anion, and so on.

<Organic solvent (D)>

The organic solvent (D) includes (1) an alcohol, (2) an ether, (3) an amide, (4) an oxazolidinone, (5) a lactone, (6) a nitrile, (7) a carbonate, (8) a sulfone, and (9) other organic solvents.

(1) An Alcohol

A Monohydric alcohol (methanol, ethanol, propanol, butanol, diacetone alcohol, benzyl alcohol, amino alcohol, furfuryl alcohol, etc.), a dihydric alcohol (ethylene glycol, propylene glycol, diethylene glycol, hexylene glycol, etc.), trihydric alcohols (glycerol etc.), a tetra- or higher hydric alcohol (hexitol, etc.), and so on.

(2) An Ether

A monoether (ethylene glycol monomethyl ether, ethylene glycol monoethyl ether, ethylene glycol monophenyl ether, tetrahydrofuran, 3-methyltetrahydrofuran, etc.), a diether (ethylene glycol dimethyl ether, ethylene glycol diethyl ether, diethylene glycol monomethyl ether, diethylene glycol monoethyl ether, etc.), a triether (diethylene glycol dimethyl ether, diethylene glycol diethyl ether, etc.), and so on.

(3) An Amide

A formamide (N-methylformamide, N,N-diimethylformamide, N-ethylformamide, N,N-diethylformamide, etc.), an acetamide (N-methylacetamide, N,N-dimethylacetamide, N-ethylacetamide, N,N-diethylacetamide, etc.), a propionamide (N,N-dimethylpropionamide, etc.), a pyrrolidone (N-methylpyrrolidone, N-ethylpyrrolidone, etc.), hexamethyl phosphoryl amide, and so on.

(4) An Oxazolidinone

N-Methyl-2-oxazolidinone, 3,5-dimethyl-2-oxazolidinone, etc.

(5) A Lactone

γ-Butyrolactone (hereinafter abbreviated as GBL), α-acetyl-butyrolactone, β-butyrolactone, γ-valerolactone, δ-valerolactone, etc.

(6) A Nitrile

Acetonitrile, propionitrile, butyronitrile, acrylonitrile, methacrylonitrile, benzonitrile, etc.

(7) A Carbonate

Ethylene carbonate, propione carbonate, butylene carbonate, dimethyl carbonate, diethyl carbonate, etc.

(8) A Sulfone

Sulfolane, dimethyl sulfoxide, dimethylsulfone, etc.

(9) Other Organic Solvents 1,3-Dimethyl-2-imidazolidinone, an aromatic solvent (toluene, xylene, etc.), a paraffin solvent (normal paraffins, isoparaffins, etc.), and so on.

Organic solvents may be used either solely or in combination. Among these, an alcohol, a lactone and a sulfone are preferable, and γ-butyrolactone, sulfolane and an ethylene glycol are more preferable.

From the viewpoint of specific conductivity and solubility to organic solvents, the content of the electrolyte (C) is preferably from 5 to 70 wt %, and particularly preferably from 10 to 40 wt % on the basis of a weight of the electrolyte (C) and the organic solvent (D).

From the viewpoint of specific conductivity, the content of the organic solvent (D) is preferably from 30 to 95 wt %, and particularly preferably from 60 to 90 wt % on the basis of a weight of the electrolyte (C) and the organic solvent (D).

It is preferable that the electrolytic solution of the present invention further contain water. If the electrolytic solution contains water, it is possible to provide capacitor elements (e.g., an aluminum oxide foil serving as an anode foil) with an improved chemical conversion property (property of forming, if there is a defect in the surface of an anode foil, an oxide film to repair the defect). On the other hand, if the content of water is excessively large, the hydrolysis of the alkyl phosphate anion becomes easier to proceed, so that phosphoric acid resulting from the hydrolysis will corrode capacitor elements. Therefore, when the electrolytic solution contains water, the content of water is preferably from 0.01 to 5 wt %, more preferably from 0.05 to 1 wt %, and particularly preferably from 0.1 to 0.5 wt % on the basis of a weight of the electrolyte (C) and the organic solvent (D). The water content is measured in accordance with JIS K0113:2005 "8. Karl-Fischer titration method, 8.1 Quantitative titration method" {corresponding to International Standard ISO 760:1978; the disclosure of which is incorporated herein by reference}.

The molar ratio (A/B) of the alkyl phosphate anion (A) and the cation (B) in the electrolyte (C) is preferably from 0.9 to 1.1, more preferably from 0.95 to 1.05, and particularly preferably from 0.98 to 1.02 from the viewpoint of the corrosion of capacitor elements {sealing rubber, aluminum oxide foil, etc. in aluminum electrolytic capacitors}.

If the ratio (A/B) is less than 1, the electrolytic solution becomes alkaline, so that butyl rubber serving as a sealing rubber in an aluminum electrolytic capacitor becomes easier to be degraded and, as a result, undesirable events such as leakage of an electrolytic solution from a capacitor become more likely to occur. On the other hand, if the ratio (A/B) exceeds 1, the electrolytic solution becomes acidic, so that an aluminum oxide foil of the anode becomes easier to be corroded and, as a result, undesirable events such as short circuit become more likely to occur.

To the electrolytic solution of the present invention, various additives which are used ordinarily for electrolytic solutions can be added, as needed. Examples of such additives include a boric acid derivative (e.g., boric acid, complex compounds composed of boric acid and a polysaccharide (e.g., mannitol and sorbitol), complex compounds composed of boric acid and a polyhydric alcohol (e.g., ethylene glycol and glycerol), and a nitro compound (e.g., o-nitrobenzoic acid, p-nitrobenzoic acid, m-nitrobenzoic acid, o-nitrophenol and p-nitrophenol). From the viewpoint of specific conductivity and solubility to an electrolytic solution, the added amount of such additives is preferably 5 wt % or less, and particularly preferably 2 wt % or less on the basis of a weight of the electrolyte (C) and the organic solvent (D).

The electrolytic solution of the present invention is suited for an aluminum electrolytic capacitor. The aluminum electrolytic capacitor is not particularly restricted and may be a wound aluminum electrolytic capacitor fabricated by winding an anode (aluminum oxide foil) having aluminum oxide formed on a surface of the anode and a cathode aluminum foil with a separator interposed therebetween. An aluminum electrolytic capacitor can be fabricated by impregnating a separator with the electrolytic solution of the present invention as an electrolytic solution for driving, placing the impregnated separator into a bottomed tubular aluminum housing together with an anode and a cathode, and sealing the opening of the aluminum housing with a sealing rubber.

EXAMPLES

The present invention is described with reference to concrete examples, but the invention is not limited thereto.

Example 1

A methanol solution of 1,2,3,4-tetramethyl imidazolinium methyl carbonate salt was obtained by dropping 2,4-dimethylimidazoline (0.1 mol) to a methanol solution (74 wt %) of dimethyl carbonate (0.2 mol) and stirring the mixture at 120° C. for 15 hours.

A salt exchange reaction was performed by adding methyl phosphate mixed ester (about 1 to 3 wt % of phosphoric acid, about 44 to 49 wt % of monomethyl phosphate, about 44 to 49 wt % of dimethyl phosphate and about 3 to 5 wt % of trimethyl phosphate) (AP-1; produced by Daihachi Chemical Industries Co., Ltd.) (0.1 mol) to a methanol solution of 1,2,3,4-tetramethylimidazolinium methyl carbonate salt (0.1 mol), and thereby obtaining a methanol solution of 1,2,3,4-tetramethylimidazolinium methyl phosphate mixed ester anion. The resulting solution was heated at a pressure reduction degree of 1.0 kPa or less at 50° C., so that methanol was evaporated until methanol was no longer distilled off. Then, the temperature was increased from 50° C. to 100° C. and subsequently heating was continued for 30 minutes to distill monomethyl carbonate ($HOCO_2CH_3$) off together with methanol and carbon dioxide, which are formed slightly through thermal decomposition of monomethyl carbonate and hereinafter abbreviated as by-products. An electrolyte (c1) {1,2,3,4-tetramethylimidazolinium methyl phosphate mixed ester anion} was thereby obtained. The yield of the product was 98 wt %, which was a yield on the basis of the weight of 1,2,3,4-tetramethylimidazolinium methyl carbonate salt (0.1 mol); ditto in the following.

The electrolytic solution of the present invention was obtained by dissolving 25 g of the electrolyte (c1) in 75 g of an organic solvent (d1) {γ-butyrolactone (made by Mitsubishi Chemical Corp.)}. The content of phosphoric acid contained in the electrolytic solution was 0.14 wt %. The water content was 0.1 wt % (ditto in the following).

Example 2

An electrolyte (c2) {1,2,3,4-tetramethylimidazolinium butyl phosphate mixed ester anion} was obtained in the same manner as Example 1, except for using a butyl phosphate mixed ester (about 20 wt % of mono(n-butyl) phosphate, about 60 wt % of di(n-butyl) phosphate, and about 20 wt % of tri(n-butyl) phosphate) (DP-4; produced by Daihachi Chemical Industries Co., Ltd.) instead of the methyl phosphate (AP-1). The yield was 99 wt %.

An electrolytic solution of the present invention was obtained by dissolving 25 g of the electrolyte (c2) in 75 g of an organic solvent (d1). The content of phosphoric acid contained in the electrolytic solution was 0.03 wt %.

Example 3

An electrolyte (c3) {1,2,3,4-tetramethylimidazolinium 2-ethylhexyl phosphate mixed ester anion} was obtained in the same manner as Example 1, except for using a 2-ethylhexyl phosphate mixed ester [about 3 wt % of mono(2-ethylhexyl) phosphate, about 95 wt % of bis(2-ethylhexyl) phosphate, and about 2 wt % of tris(2-ethylhexyl) phosphate] (DP-8R; produced by Daihachi Chemical Industries Co., Ltd.) instead of the methyl phosphate (AP-1). The yield was 99 wt %.

An electrolytic solution of the present invention was obtained by dissolving 25 g of the electrolyte (c3) in 75 g of an organic solvent (d1). The content of phosphoric acid contained in the electrolytic solution was 0.01 wt %.

Example 4

An electrolyte (c4) {1,2,3,4-tetramethylimidazolinium (isopropyl) phosphate mixed ester anion} was obtained in the same manner as Example 1, except for using an (isopropyl) phosphate mixed ester (about 44 to 49 wt % of mono(isopropyl) phosphate, about 44 to 49 wt % of di(isopropyl) phosphate, and about 3 to 5 wt % of tri(isopropyl) phosphate) (PAP; produced by Nippon Chemical Industries Co., Ltd.) instead of the methyl phosphate (AP-1). The yield was 99 wt %.

An electrolytic solution of the present invention was obtained by dissolving 25 g of the electrolyte (c4) in 75 g of an organic solvent (d1). The content of phosphoric acid contained in the electrolytic solution was 0.08 wt %.

Example 5

By adding trimethyl phosphate (TMP, produced by Daihachi Chemical Industries Co., Ltd.) (0.1 mol) to a methanol solution of 1,2,3,4-tetramethylimidazolinium methyl carbonate salt (0.1 mol) obtained in the same manner as Example 1, adding water (0.3 mol) and stirring the mixture at 100° C. for 20 hours, the trimethyl phosphate was hydrolyzed and, at the same time, a salt exchange reaction was performed. As a result, a methanol solution of 1,2,3,4-tetramethylimidazolinium dimethyl phosphate monoanion was obtained. The resulting solution was heated at a pressure reduction degree of 1.0 kPa or less at 50° C., so that methanol was evaporated until methanol was no longer distilled off. By increasing the temperature from 50° C. to 100° C. and heating the mixture for 30 minutes to distill by-products off, an electrolyte (c5) {1,2,3,4-tetramethylimidazolinium dimethyl phosphate monoanion} was obtained. The yield was 99 wt %. The content of dimethyl phosphoric acid monoanion in the anions was 99% by mol.

An electrolytic solution of the present invention was obtained by dissolving 25 g of the electrolyte (c5) in 75 g of an organic solvent (d1). The content of phosphoric acid contained in the electrolytic solution was 0.14 wt %.

Example 6

An electrolyte (c6) {1,2,3,4-tetramethylimidazolinium diethyl phosphate monoanion} was obtained in the same manner as Example 5, except for using triethyl phosphate (TEP: produced by Daihachi Chemical Industries Co., Ltd.) instead of the trimethyl phosphate (TMP). The yield was 99 wt %. The content of diethyl phosphate monoanion in the anions was 99% by mol.

An electrolytic solution of the present invention was obtained by dissolving 25 g of the electrolyte (c6) in 75 g of an organic solvent (d1). The content of phosphoric acid contained in the electrolytic solution was 0.12 wt %.

Example 7

An electrolyte (c7) {1,2,3,4-tetramethylimidazolinium di(n-propyl) phosphate monoanion} was obtained in the same manner as Example 5, except for using tri(n-propyl) phosphate (Tripropyl Phosphate: produced by Aldrich) instead of the trimethyl phosphate (TMP). The yield was 99 wt %. The content of di(n-propyl) phosphate monoanion in anions was 99% by mol.

An electrolytic solution of the present invention was obtained by dissolving 25 g of the electrolyte (c7) in 75 g of an organic solvent (d1). The content of phosphoric acid contained in the electrolytic solution was 0.08 wt %.

Example 8

An electrolyte (c8) {1,2,3,4-tetramethylimidazolinium di(isopropyl) phosphate monoanion} was obtained in the same manner as Example 5, except for using tri(isopropyl) phosphate (Tripropyl Phosphate: produced by Aldrich) instead of the trimethyl phosphate (TMP). The yield was 99 wt %. The content of di(isopropyl) phosphate monoanion in anions was 99% by mol.

An electrolytic solution of the present invention was obtained by dissolving 25 g of the electrolyte (c8) in 75 g of an organic solvent (d1). The content of phosphoric acid contained in the electrolytic solution was 0.07 wt %.

Example 9

An electrolyte (c9) {1,2,3,4-tetramethylimidazolinium di(n-butyl) phosphate monoanion} was obtained in the same manner as Example 5, except for using tri(n-butyl) phosphate (TBP: produced by Daihachi Chemical Industries Co., Ltd.)

instead of the trimethyl phosphate (TMP). The yield was 99 wt %. The content of di(n-butyl) phosphate monoanion in the anions was 99% by mol.

An electrolytic solution of the present invention was obtained by dissolving 25 g of the electrolyte (c9) in 75 g of an organic solvent (d1). The content of phosphoric acid contained in the electrolytic solution was 0.04 wt %.

Example 10

A methanol solution of 1-ethyl-3-methyl imidazolium methyl carbonate salt was obtained by dropping 1-ethylimidazole (0.1 mol) to a methanol solution (74% by weight) of dimethyl carbonate (0.1 mol) and stirring the mixture at 120° C. for 15 hours.

By adding triethyl phosphate (TEP, produced by Daihachi Chemical Industries Co., Ltd.) (0.1 mol) to a methanol solution of 1-ethyl-3-methylimidazolium methyl carbonate salt (0.1 mol), adding water (0.3 mol) and stirring the mixture at 100° C. for 20 hours, the triethyl phosphate was hydrolyzed and, at the same time, a salt exchange reaction was performed. As a result, a methanol solution of 1-ethyl-3-methylimidazolium diethyl phosphate monoanion was obtained. The resulting solution was heated at a pressure reduction degree of 1.0 kPa or less at 50° C., so that methanol was evaporated until methanol was no longer distilled off. By increasing the temperature from 50° C. to 100° C. and heating the mixture for 30 minutes to distill by-products off, an electrolyte (c10) {1-ethyl-3-methylimidazolium diethyl phosphate monoanion} was obtained. The yield was 98 wt %. The content of diethyl phosphate in the anions was 99% by mol.

An electrolytic solution of the present invention was obtained by dissolving 25 g of the electrolyte (c10) in 75 g of an organic solvent (d1). The content of phosphoric acid contained in the electrolytic solution was 0.12 wt %.

Example 11

An electrolyte (c10) {1,2,3,4-tetramethylimidazolinium methyl phosphate mixed ester anion} was obtained in the same manner as Example 1, except for changing heating the methanol solution of 1,2,3,4-tetramethylimidazolinium methyl phosphate mixed ester anion at 100° C. for 30 minutes (distillation of by-products) to heating the solution at 110° C. for 3 hours. The yield was 98 wt %.

An electrolytic solution of the present invention was obtained by dissolving 25 g of the electrolyte (c11) in 75 g of an organic solvent (d1). The content of phosphoric acid contained in the electrolytic solution was 0.50 wt %.

Comparative Example 1

In the same manner as Example 1, except for using o-phthalic acid instead of the methyl phosphate (AP-1), an electrolyte (HC1) {1,2,3,4-tetramethylimidazolinium o-phthalic acid} was obtained. The yield was 99 wt %.

An electrolytic solution for comparison was obtained by dissolving 25 g of the electrolyte (HC1) in 75 g of an organic solvent (d1). No phosphoric acid was detected in the electrolytic solution.

Comparative Example 2

A methanol solution of 1,2,3,4-tetramethyl imidazolinium methyl carbonate salt was obtained by dropping 2,4-dimethylimidazoline (0.1 mol) to a methanol solution (74% by weight) of dimethyl carbonate (0.2 mol) and stirring the mixture at 120° C. for 15 hours.

A salt exchange reaction was performed by adding methyl phosphate mixed ester (AP-1; produced by Daihachi Chemical Industries Co., Ltd.) (0.1 mol) to a methanol solution of 1,2,3,4-tetramethylimidazolinium methyl carbonate salt (0.1 mol), and thereby a methanol solution of 1,2,3,4-tetramethylimidazolinium methyl phosphate mixed ester monoanion was obtained. By heating the above-mentioned solution at a pressure reduction degree of 1.0 kPa or less at 120° C. to evaporate methanol until methanol was no longer distilled off, an electrolyte (HC2) {1,2,3,4-tetramethylimidazolinium methyl phosphate mixed ester monoanion} was obtained. The yield was 98 wt %.

An electrolytic solution for comparison was obtained by dissolving 25 g of the electrolyte (HC2) in 75 g of an organic solvent (d1). The content of phosphoric acid contained in the electrolytic solution was 1.18 wt %.

Using the electrolytic solutions obtained in Examples 1 to 11 and Comparative Examples 1 and 2, specific conductivities and sparking voltages were measured and the results are shown in Table 1.

Specific conductivity: A specific conductivity at 30° C. was measured using an electric conductivity meter CM-40S manufactured by Toa Electronics Ltd.

Sparking voltage: A discharge voltage of an electrolytic solution at 25° C. under a load of constant current method (2 mA) was measured by using a 10 cm$^2$, chemically-formed, etched aluminum foil for high voltage use as an anode and a 10 cm$^2$ plane aluminum foil as a cathode.

Phosphoric acid content: Measurement was performed using an ion chromatography system manufactured by Shimadzu Corporation.
Column: Shim-Pack IC-A1
Mobile phase: Mixed solvent of 2.5 mM aqueous solution of phthalic acid and 2.4 mM of aqueous solution of tris(hydroxymethyl)aminomethane (pH 4.0)
Flow rate: Flow rate of 1.5 mL/min (commercial name: Pump LP-6A, Shimadzu Corporation)
Column oven (CTO-6AS): Temperature of 40° C.
Detector (CDD-6A): Polarity (+)
Content of dialkyl phosphate in anions: Measurement was performed using a superconductivity NMR analyzer AL-300 manufactured by JEOL.
Sample preparation: Into an NMR tube of 5 mm in diameter, 30 mg of a sample, 0.3 mL of deuteromethanol and 0.1 mL of triethylamine were added. Measured nucleus: 31P
Chemical shift of phosphoric acid diester: Near −2 ppm, quintet Using the electrolytic solutions obtained in Example 1 to 11 and Comparative Examples 1 and 2, wound aluminum electrolytic capacitors (rated voltage of 100 WV, electrostatic capacitance of 200 OF, size: 10 mm in diameter, 16 mm in length) were produced.

The aluminum electrolytic capacitors produced were subjected to a load test {leaving at rest at 125° C. for 500 hours}, followed by measurement of the loss angle tangent (tan δ), the leakage current (LC) and the phosphoric acid content. Evaluation results are shown in Table 1. Each valuation result is an average of ten measurements. The loss angle tangent (tan δ) and the leakage current (LC) were measured in accordance with Japanese Industrial Standards JIS C5101-4: 1998 {corresponding to International Standard IEC 60384-4: 1985; the disclosure of which is incorporated herein by reference; ditto in the following}.

Moreover, the electrostatic capacitance before the load test (C0) and the electrostatic capacitance after the load test (C1) were measured in accordance with JIS C5101-4: 1998. Then, the electrostatic capacitance dropped by the load test (ΔC) was calculated and is shown in Table 1. Moreover, the amount of phosphoric acid which increased in a load test (ΔP) was calculated from the content of phosphoric acid before the load test (P0) and the content of phosphoric acid after the load test (P1), it is shown in Table 1.

TABLE 1

|  |  | Specific conductivity mS/cm | Sparking voltage V | ΔC % | tanδ % | LC μF | P0 Wt % | P1 wt % | ΔP wt % |
|---|---|---|---|---|---|---|---|---|---|
| Examples | 1 | 9.0 | 248 | −7 | 5.2 | 10 | 0.14 | 0.64 | 0.50 |
|  | 2 | 5.6 | 172 | −4 | 4.8 | 8 | 0.03 | 0.30 | 0.27 |
|  | 3 | 4.2 | 178 | −2 | 3.8 | 7 | 0.01 | 0.05 | 0.04 |
|  | 4 | 6.5 | 182 | −5 | 5.0 | 9 | 0.08 | 0.40 | 0.32 |
|  | 5 | 8.5 | 240 | −3 | 4.6 | 7 | 0.14 | 0.39 | 0.25 |
|  | 6 | 7.5 | 200 | −3 | 4.6 | 7 | 0.12 | 0.32 | 0.20 |
|  | 7 | 6.4 | 180 | −3 | 4.4 | 7 | 0.08 | 0.22 | 0.14 |
|  | 8 | 6.5 | 178 | −3 | 4.5 | 7 | 0.07 | 0.20 | 0.13 |
|  | 9 | 5.5 | 170 | −3 | 4.2 | 7 | 0.04 | 0.14 | 0.10 |
|  | 10 | 7.5 | 200 | −3 | 4.6 | 7 | 0.12 | 0.34 | 0.22 |
|  | 11 | 9.0 | 230 | −10 | 6.0 | 20 | 0.5 | 0.99 | 0.49 |
| Comparative Examples | 1 | 12.6 | 73 | −85 | 78.6 | 919 | 0 | 0 | 0 |
|  | 2 | 8.9 | 224 | −25 | 13.5 | 756 | 1.18 | 1.73 | 0.55 |

As is clear from Table 1, the electrolytic solutions of the present invention (Examples 1 to 11) had sparking voltages high enough while maintaining their specific conductivities at 30° C. at 4 mS/cm or more. On the other hand, the electrolytic solution obtained in Comparative Example 1 had so a low sparking voltage that short circuit occurred at the anode foil at a rated voltage of 100 WV, resulting in a remarkably large change (ΔC) in electrostatic capacitance and also in great increase in both loss angle tangent (tan δ) and leakage current (LC).

In comparison of the contents of phosphoric acid in Examples 1, 11 and Comparative Example 2 where a methyl phosphate was used as anion, short circuit occurred at the anode foil due to corrosion of the foil in Comparative Example 2 in which the phosphoric acid content was high, resulting in a remarkably large change (ΔC) in electrostatic capacitance and also in increase in both loss angle tangent (tan δ) and leakage current (LC). On the other hand, in Examples 1 to 11 where the phosphoric acid content was low, the change of electrostatic capacitance (ΔC) was small and both the change of loss angle tangent (tan δ) and the change of leakage current (LC) were small, so that capacitors with high reliabilities were produced successfully.

In comparison to an electrolytic solution containing a mono(n-butyl) phosphate anion and di(n-butyl) phosphate anion (Example 2), the electrolytic solution containing di(n-butyl) phosphate anion obtained in Example 9 exhibited a smaller increase in the amount of phosphoric acid (ΔP), and the change of electrostatic capacitance (ΔC), the change of loss angle tangent (tan δ) and the change of leakage current (LC) were all successfully reduced more. Likewise, in comparison to the electrolytic solution containing a monomethyl phosphate anion and dimethyl phosphate anion (Example 1), the electrolytic solution containing dimethyl phosphate anion obtained in Example 5 exhibited a smaller increase in the amount of phosphoric acid (ΔP), and the change of electrostatic capacitance (ΔC), the change of loss angle tangent (tan δ) and the change of leakage current (LC) were all successfully reduced more. The comparison of Example 4 and Example 8 is the same as above.

INDUSTRIAL APPLICABILITY

Use of the electrolytic solution of the present invention enables achieving a high specific conductivity and a high sparking voltage simultaneously and can realize an aluminum electrolytic capacitor with no worries about corrosion of capacitor elements. Therefore, in progress of increase in withstand voltage of working power supplies in the market, the electrolytic solution of this invention has an extremely great market value.

The invention claimed is:

1. An electrolytic solution comprising an electrolyte (C) composed of an alkyl phosphate anion (A) represented by formula (1) or (2) given below and a cation (B), and an organic solvent (D), wherein the content of phosphoric acid contained in the electrolytic solution is 1% by weight or less:

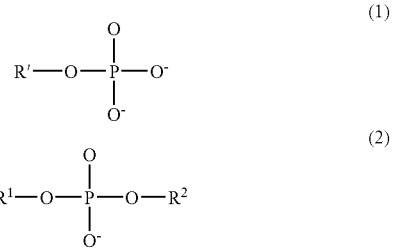

wherein $R^1$ is an alkyl group having 1 to 10 carbon atoms and $R^2$ is a hydrogen atom or an alkyl group having 1 to 10 carbon atoms,
wherein the cation (B) is at least one selected from the group consisting of 1,2,3,4-tetramethylimidazolinium cation, 1-ethyl-2,3-dimethylimidazolinium cation, 1-ethyl-3-methylimidazolium cation, and 1-ethyl-2,3-dimethylimidazolium cation.

2. The electrolytic solution according to claim 1, wherein in formulae (1) and (2), $R^1$ is an alkyl group having 1 to 4 carbon atoms and $R^2$ is a hydrogen atom or an alkyl group having 1 to 4 carbon atoms.

3. The electrolytic solution according to claim 1, wherein the alkyl phosphate anion (A) is an anion represented by formula (2).

4. The electrolytic solution according to claim 1, wherein the alkyl phosphate anion (A) is at least one selected from the group consisting of dimethyl phosphate anion, diethyl phosphate anion, di-isopropyl phosphate anion, di-n-propyl phosphate anion, di-n-butyl phosphate anion, di-isobutyl phosphate anion, and di-tert-butyl phosphate anion.

5. The electrolytic solution according to claim 1, wherein the anion (A) is at least one selected from the group consisting of monomethyl phosphate anion, dimethyl phosphate anion, monobutyl phosphate anion, dibutyl phosphate anion, mono(2-ethylhexyl) phosphate anion, and bis(2-ethylhexyl) phosphate anion.

6. The electrolytic solution according to claim 1, wherein the organic solvent (D) is at least one selected from the group consisting of γ-butyrolactone, sulfolane and ethylene glycol.

7. An aluminum electrolytic capacitor comprising the electrolytic solution according to claim 1.

* * * * *

UNITED STATES PATENT AND TRADEMARK OFFICE
CERTIFICATE OF CORRECTION

PATENT NO. : 8,177,994 B2
APPLICATION NO. : 12/305285
DATED : May 15, 2012
INVENTOR(S) : Shinya Taguchi et al.

It is certified that error appears in the above-identified patent and that said Letters Patent is hereby corrected as shown below:

On Title Page, Item [57] in Abstract, Formula (1) & (2):
Change

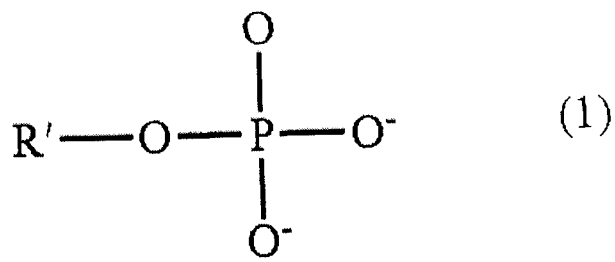

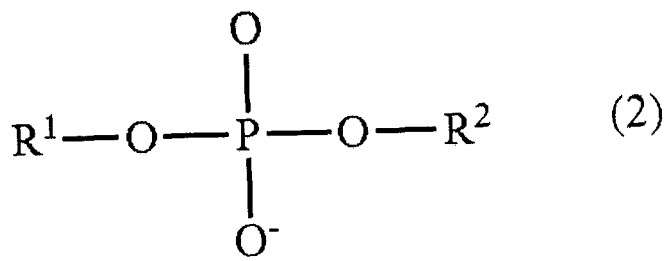

To be

Signed and Sealed this
Twenty-ninth Day of January, 2013

David J. Kappos
*Director of the United States Patent and Trademark Office*

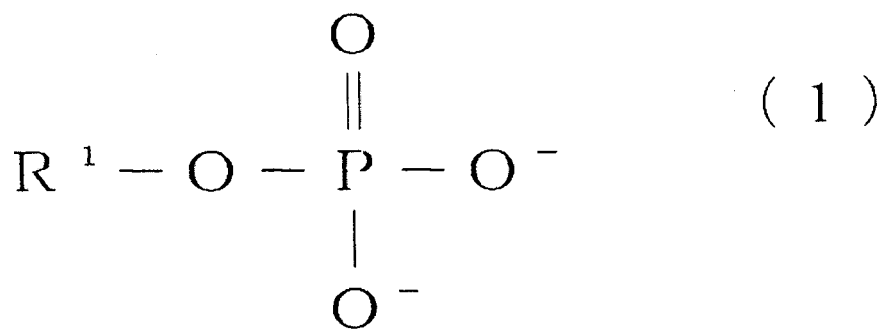
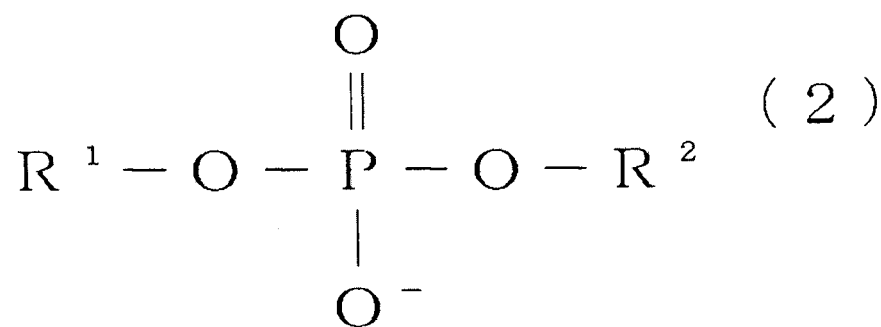
In Column 2, Lines 1-12, Formula (1) & (2):
Change
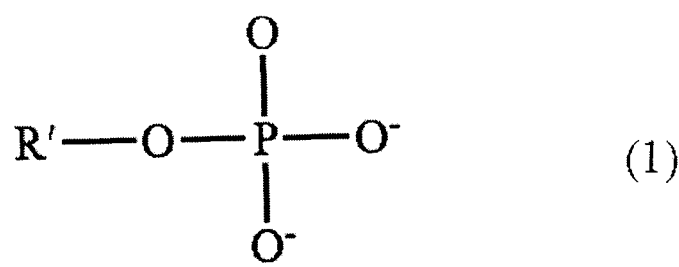
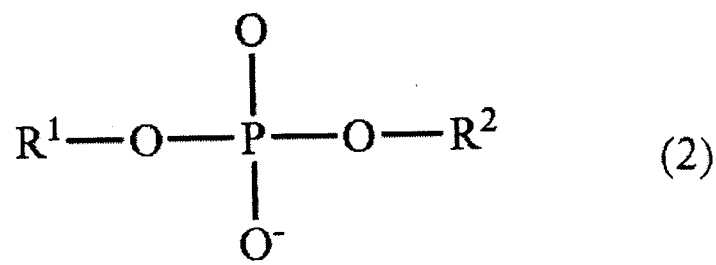
To be

CERTIFICATE OF CORRECTION (continued)
U.S. Pat. No. 8,177,994 B2

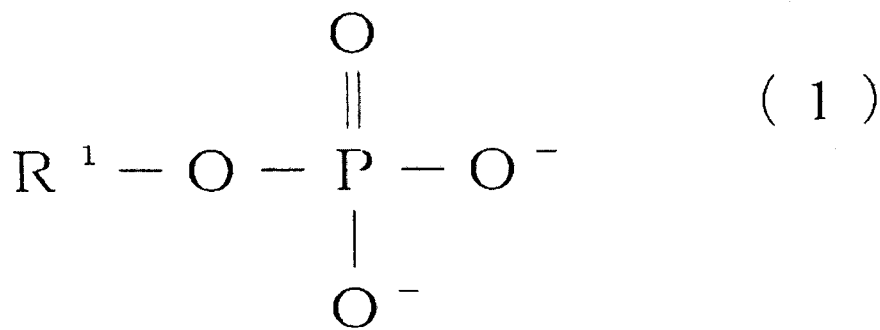

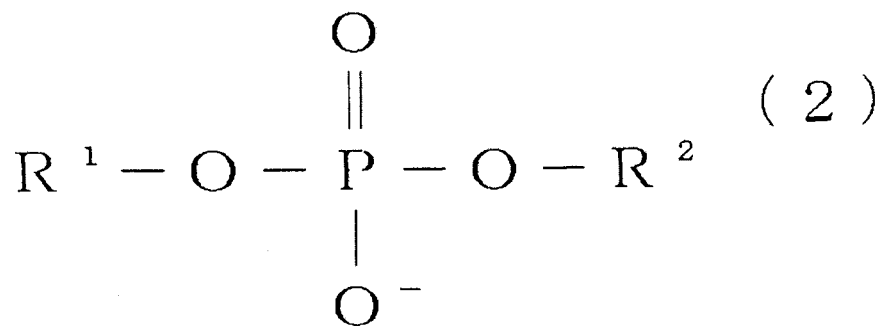

<u>In Column 12, Claim 1, Formula (1) & (2):</u>
Change

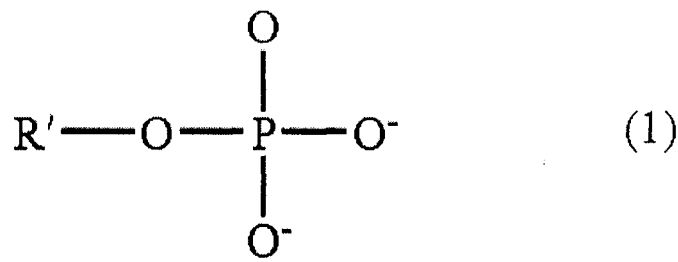

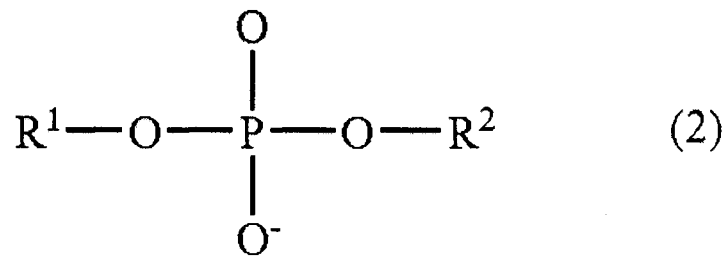

To be

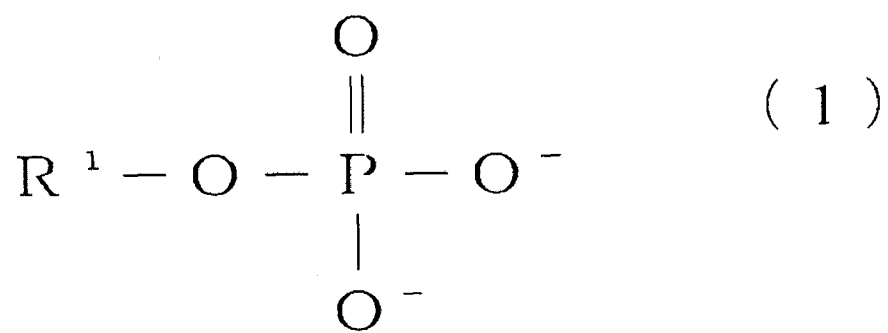
(1)
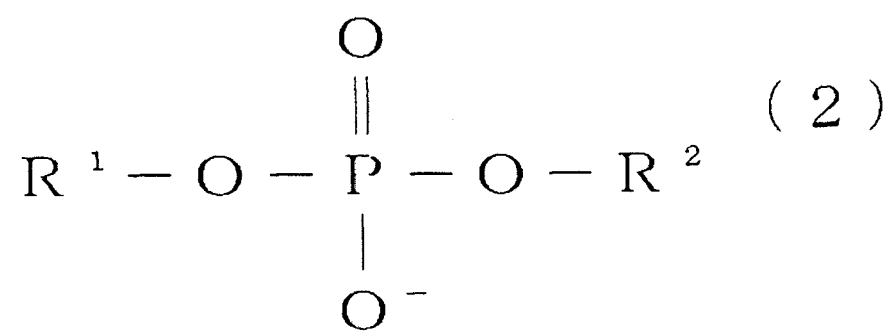
(2)